United States Patent
Capell et al.

(10) Patent No.: US 10,189,333 B2
(45) Date of Patent: Jan. 29, 2019

(54) METHOD OF MODIFYING A HEAVY DUTY TRUCK AIR CONDITIONING SYSTEM

(71) Applicants: Kenneth Capell, Philadelphia, TN (US); Patti Lane, Roswell, GA (US)

(72) Inventors: Kenneth Capell, Philadelphia, TN (US); Patti Lane, Roswell, GA (US)

(*) Notice: Subject to any disclaimer, the term of this patent is extended or adjusted under 35 U.S.C. 154(b) by 177 days.

(21) Appl. No.: 15/350,380

(22) Filed: Nov. 14, 2016

(65) Prior Publication Data

US 2017/0136850 A1    May 18, 2017

Related U.S. Application Data

(60) Provisional application No. 62/254,210, filed on Nov. 12, 2015.

(51) Int. Cl.
*B60H 1/32* (2006.01)
*B60H 1/00* (2006.01)

(52) U.S. Cl.
CPC ....... *B60H 1/3227* (2013.01); *B60H 1/00378* (2013.01); *B60H 1/3229* (2013.01); *B60H 1/3232* (2013.01)

(58) Field of Classification Search
CPC  B60H 1/00378; B60H 1/3227; B60H 1/3229; B60H 1/3232
See application file for complete search history.

(56) References Cited

U.S. PATENT DOCUMENTS

| | | | |
|---|---|---|---|
| 3,597,935 A * | 8/1971 | Pierrat | B60H 1/00007 62/163 |
| 4,257,554 A | 3/1981 | Willingham | |
| 4,875,521 A | 10/1989 | Clemente | |
| 6,186,255 B1 | 2/2001 | Shimasaki et al. | |
| 7,284,594 B2 | 10/2007 | Sanada et al. | |
| 8,020,656 B2 * | 9/2011 | Inoue | B60K 6/40 180/68.4 |
| 8,141,377 B2 | 3/2012 | Connell et al. | |
| 8,565,969 B2 | 10/2013 | Bradley et al. | |
| 2007/0131408 A1 | 6/2007 | Zeigler et al. | |

* cited by examiner

*Primary Examiner* — Filip Zec
(74) *Attorney, Agent, or Firm* — Matthew M. Googe; Robinson IP Law, PLLC

(57) ABSTRACT

A heavy duty truck includes an air conditioning loop having a compressor, a condenser mounted within an engine bay of the truck, an evaporator, and a cooling fan belt-driven by an engine of the truck mounted within the engine bay adjacent a radiator of the truck. A method of modifying the air conditioning loop includes removing the condenser from the engine bay, removing the belt-driven cooling fan from the engine bay, installing a remote condenser on the truck at a location that is external from the engine bay, the remote condenser in fluid communication with the primary air conditioning loop of the truck, installing an electric cooling assembly in the engine bay adjacent to the radiator of the truck, the electric cooling assembly comprising one or more electrically powered cooling fans and a surrounding shroud, and installing a control unit in electrical communication with the one or more cooling fans.

14 Claims, 6 Drawing Sheets

METHOD OF MODIFYING A HEAVY DUTY TRUCK AIR CONDITIONING SYSTEM

CROSS-REFERENCE TO RELATED APPLICATION

This application claims priority to U.S. Provisional Patent Application No. 62/254,210 entitled "System and Method of Modifying a Truck Cooling System," which was filed on Nov. 12, 2015, the contents of which are incorporated herein by reference in its entirety.

FIELD

This disclosure relates to the field of modifying heavy duty trucks. More particularly, this disclosure relates to a method of modifying a heavy duty truck air conditioning system for improved efficiency of the truck.

BACKGROUND

Heavy duty trucks, such as over the road semi trucks, are typically operated over substantial distances and for extended periods of time. During operation, heavy duty trucks consume large quantities of fuel while moving items long distances. It is estimated that semi trucks travel between approximately 120,000 and 150,000 miles per year. While advances in aerodynamics have improved fuel efficiency in heavy duty trucks, drivers and companies typically incur significant fuel costs as a result of the long distances traveled by trucks every year.

While new trucks or "tractors" continue to introduce new technologies to improve fuel efficiency, many legacy trucks remain on the road for extensive periods of time. For example, often used trucks having over 300,000 or 500,000 are purchased by operators for continued use. Such trucks will continue to be operated up to and over 1,000,000 miles.

On a typical heavy duty truck, many components are powered by the engine of the truck. For example, a truck's air conditioning system typically includes a compressor and engine fan that are powered by one or more drive belts attached to the truck's engine. Further, a typical truck includes a condenser located within an engine compartment of the truck, commonly located behind a grill of the truck adjacent the truck's radiator. The compressor, engine fan, and condenser together reduce a fuel efficiency of the truck by obstructing a flow of air through the radiator of the truck and increasing a load on the truck's engine.

What is needed, therefore, is a method of modifying an existing heavy duty truck air conditioning system to substantially reduce a load placed on the engine and increase fuel efficiency of the heavy duty truck.

SUMMARY

Embodiments of the present disclosure provide a method of modifying an air conditioning system of a heavy duty truck for improved efficiency of the truck. In a first aspect, a method of modifying a primary air conditioning loop of a heavy duty truck is provided. The primary air conditioning loop has a compressor, a condenser mounted within an engine bay of the truck, an evaporator, and a cooling fan belt-driven by an engine of the truck mounted within the engine bay adjacent a radiator of the truck. The method includes: removing the condenser from the engine bay; removing the belt-driven cooling fan from the engine bay; installing a remote condenser on the truck at a location that is external from the engine bay, the remote condenser in fluid communication with the primary air conditioning loop of the truck; installing an electric cooling assembly in the engine bay adjacent to the radiator of the truck, the electric cooling assembly comprising one or more electrically powered cooling fans and a surrounding shroud; installing a control unit in electrical communication with the one or more cooling fans, wherein the control unit activates or deactivates one or more of the electrically powered cooling fans based on cooling needs of the engine.

In one embodiment, the remote condenser is mounted on a back of a cab of the heavy duty truck. In another embodiment, the remote condenser includes one or more electrically powered condenser fans mounted adjacent to the condenser.

In yet another embodiment, the method further includes installing a manual activation switch for activating the one or more electrically powered cooling fans of the electric cooling assembly.

In one embodiment, the method includes installing a thermometer adjacent to the radiator of the truck, wherein the installed control unit activates or deactivates one or more of the electrically powered fans based on a temperature measured by the installed thermometer.

In another embodiment, the control unit is in communication with an engine control unit of the truck, and wherein the control unit activates or deactivates one or more of the electrically powered fans based on data from the engine control unit.

In yet another embodiment, the remote condenser comprises an auxiliary power unit condenser.

In one embodiment, the truck further includes a secondary air conditioning loop that is operable when the engine is off. The installed remote condenser is also in fluid communication with the secondary air conditioning loop.

In another embodiment, the cooling assembly comprises four electrically powered cooling fans oriented in a 2×2 arrangement and surrounded by the shroud.

In yet another embodiment, the method further includes removing an oil cooler from the engine bay of the truck and installing a remote oil cooler at a location that is external to the engine bay of the truck.

In one embodiment, the method includes installing an oil purification system external to the engine bay of the truck, the oil purification system in fluid communication with the remote oil cooler.

In a second aspect, a method of modifying a primary air conditioning loop of a heavy duty truck is provided. The primary air conditioning loop has a compressor, a condenser mounted within an engine bay of the truck, an evaporator, and a cooling fan belt-driven by an engine of the truck mounted within the engine bay adjacent a radiator of the truck. The method includes: removing the condenser from the engine bay; removing the belt-driven cooling fan from the engine bay; installing a remote condenser on the truck external from the engine bay on a back of a cab of the truck, the remote condenser in fluid communication with the primary air conditioning loop of the truck, the remote condenser including one or more electrically powered condenser fans mounted adjacent to the condenser; installing an electric cooling assembly in the engine bay adjacent to the radiator of the truck, the electric cooling assembly comprising four electrically powered cooling fans oriented in a 2×2 arrangement and surrounded by a shroud; installing a control unit in electrical communication with the one or more cooling fans, wherein the control unit activates or deactivates one or more of the electrically powered cooling fans based on cooling needs of the engine; and installing a manual activation switch for activating the one or more electrically powered cooling fans of the electric cooling assembly.

In one embodiment, the method further includes removing an oil cooler from the engine bay of the truck and installing a remote oil cooler at a location that is external to the engine bay of the truck.

In a third aspect, a method of modifying a primary air conditioning loop of a heavy duty truck is provided. The primary air conditioning loop has a compressor, a condenser mounted within an engine bay of the truck, an evaporator, and a cooling fan belt-driven by an engine of the truck mounted within the engine bay adjacent a radiator of the truck. The method includes: removing the condenser from the engine bay; removing the belt-driven cooling fan from the engine bay; installing a remote condenser on the truck external from the engine bay on a back of a cab of the truck, the remote condenser in fluid communication with the primary air conditioning loop of the truck, the remote condenser including one or more electrically powered condenser fans mounted adjacent to the condenser; installing an electric cooling assembly in the engine bay adjacent to the radiator of the truck, the electric cooling assembly comprising four electrically powered cooling fans oriented in a 2×2 arrangement and surrounded by a shroud; installing a control unit in electrical communication with the one or more cooling fans, wherein the control unit activates or deactivates one or more of the electrically powered cooling fans based on cooling needs of the engine; installing a manual activation switch for activating the one or more electrically powered cooling fans of the electric cooling assembly; removing an oil cooler from the engine bay of the truck; and installing a remote oil cooler at a location that is external to the engine bay of the truck.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

Figure 1:
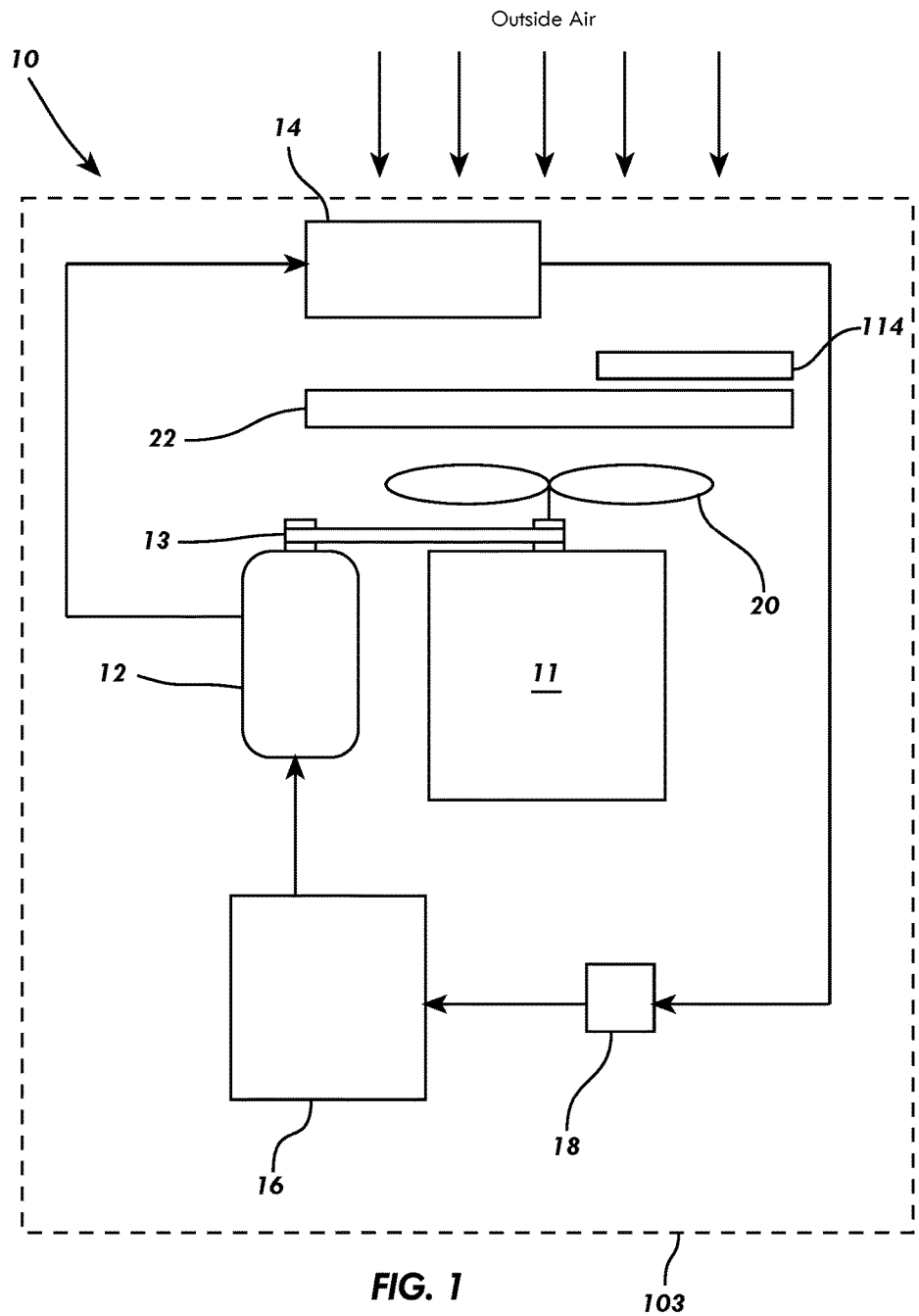
FIG. 1 shows a primary air conditioning system loop according to one embodiment of the present disclosure.

FIG. 1 shows a basic embodiment of a heavy duty truck air conditioning system loop 10. The components of a heavy duty truck's primary air conditioning system loop include a compressor 12, a condenser 14, an evaporator 16, and a drier 18. The compressor 12 is typically mounted adjacent to an engine 11 of the truck and driven by a drive belt 13 or independent belt that is driven by the truck's engine. The condenser 14 is a large heat exchanger typically mounted in front of or behind a radiator 22 of the truck The truck typically includes a cooling fan 20 for encouraging a flow of air through the truck's radiator and condenser 14.

When the truck is in operation, the compressor 12, driven by the truck's engine 11, pressurizes and circulates a refrigerant in the air conditioning system 10. High pressure vaporized refrigerant enters the condenser 14 where the refrigerant then passes through the condenser 14 and is liquefied. Outside air is drawn through the condenser 14 and radiator 22 by the fan 20, which is also driven by the truck's engine 11. The liquefied refrigerant then enters the evaporator 16 where a blower urges air across the evaporator and into an interior of a cab of the truck for cooling.

Figure 2:
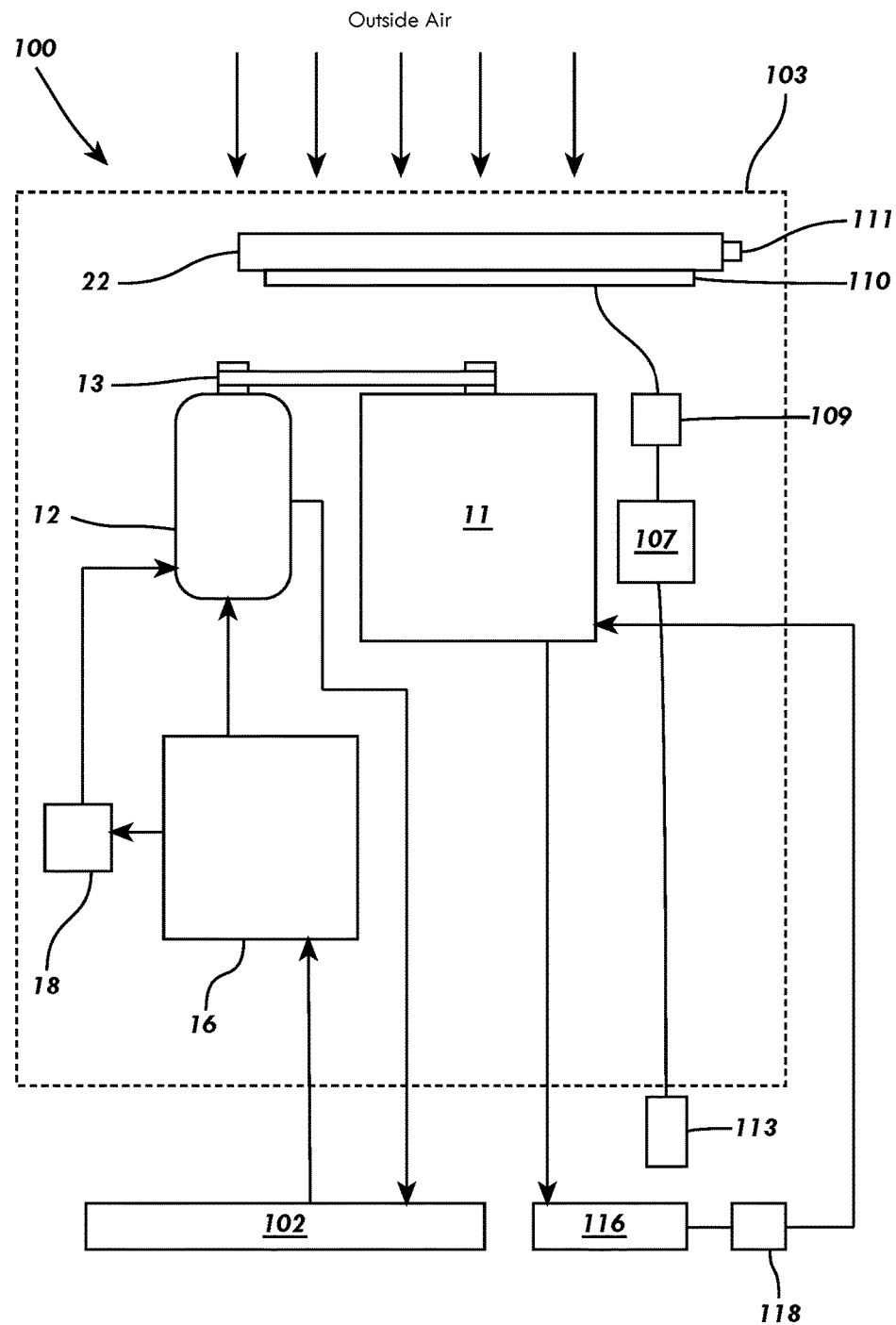
FIG. 2 shows a modified primary air conditioning system loop according to one embodiment of the present disclosure.

The system and method of providing a modified truck cooling system modifies a traditional heavy duty truck air conditioning system to remove the condenser of the truck's primary air conditioning system loop and integrate a remotely-mounted condenser into the truck's primary air conditioning system loop. FIG. 2 illustrates one embodiment of a modified truck primary cooling system loop 100. The truck's original condenser 14 (FIG. 1) is removed from the truck and a new condenser unit 102 is installed at a point remote from the truck's radiator 22, and preferably to a location outside of an engine bay 103 of the truck.

Figure 3:
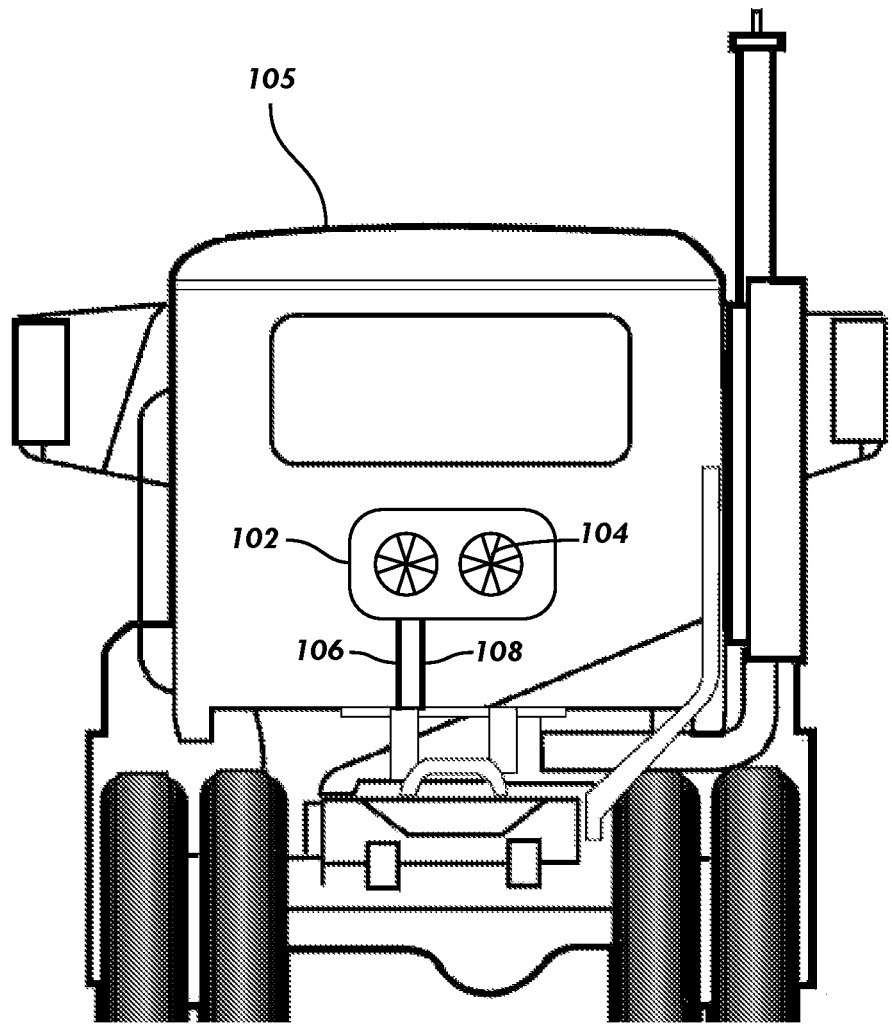
FIG. 3 shows a heavy duty truck including a remotely mounted condenser according to one embodiment of the present disclosure.
Figure 4:
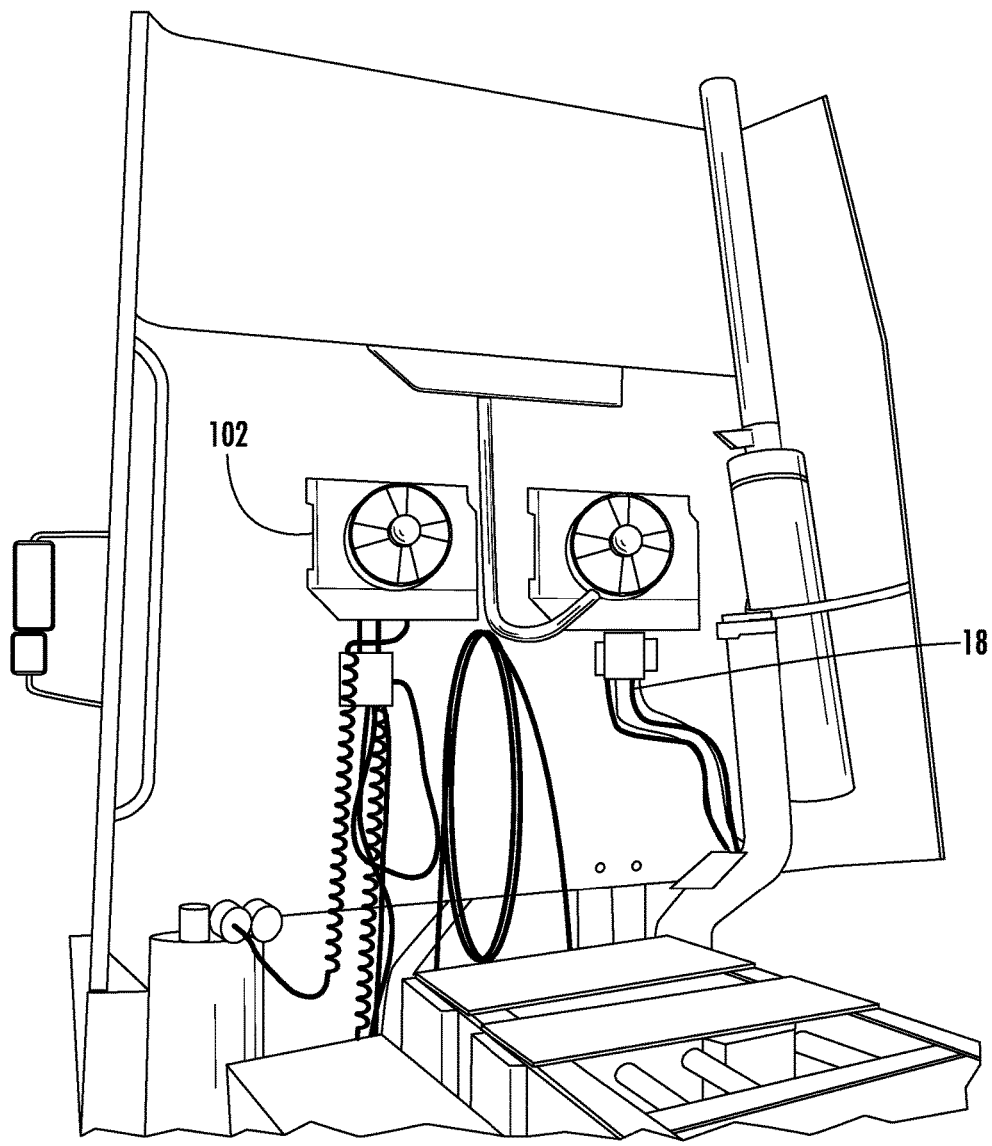
FIG. 4 shows a back of a cab of a heavy duty truck having a remotely mounted condenser according to one embodiment of the present disclosure.
Figure 5:
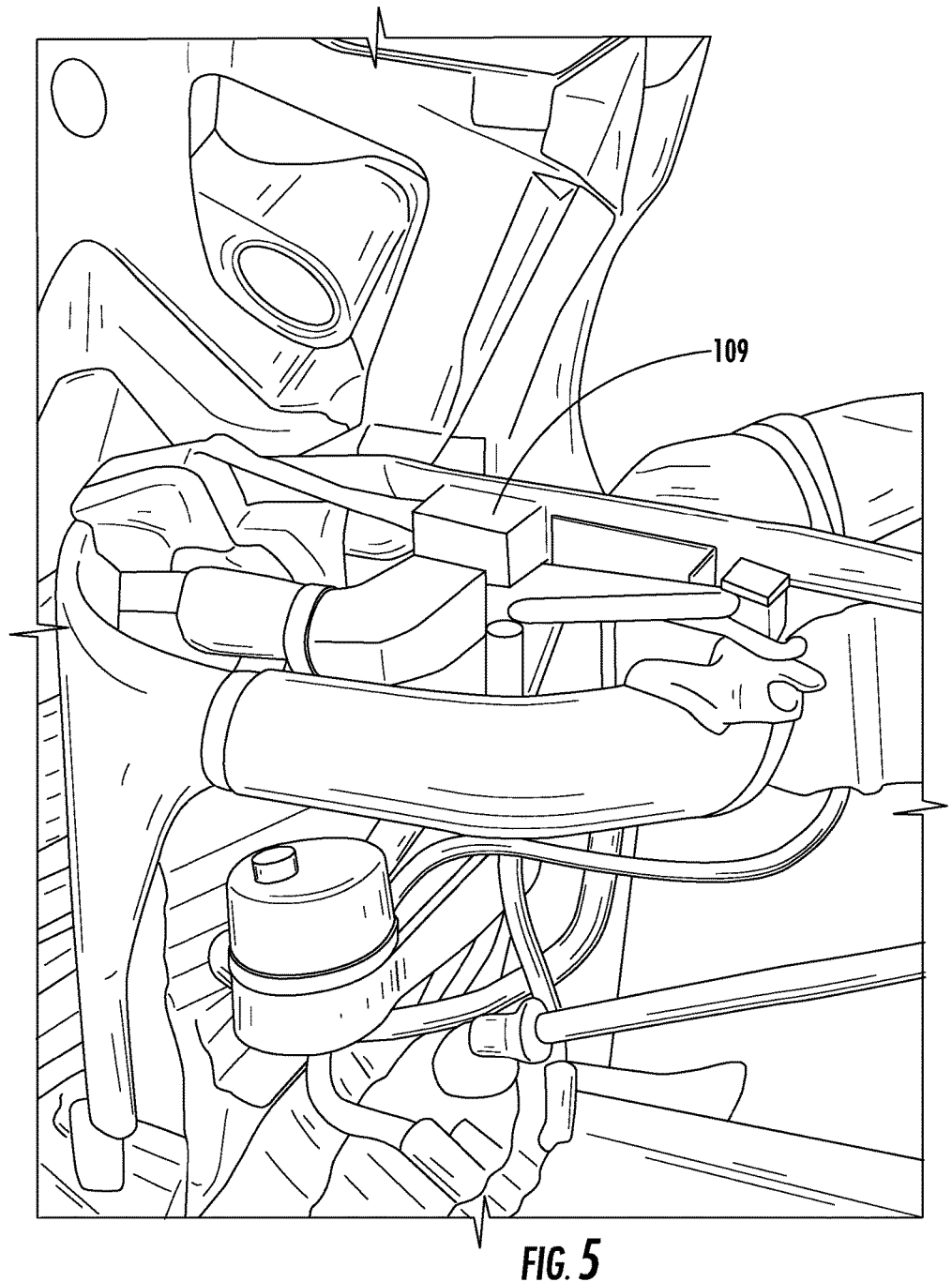
FIG. 5 shows a control unit of one or more electric fans according to one embodiment of the present disclosure.

Referring now to FIG. 3, the remote condenser 102 may be mounted to a back of a truck cab 105 on an external surface. The remote condenser 102 may include one or more electric fans 104 for urging air across the condenser. One or more refrigerant supply and return lines 106 and 108 are connected to the remote condenser 102 and are in communication with the modified truck primary cooling system loop 100. While FIG. 3 illustrates positioning the remote condenser 102 to a back of the truck cab 105, it is also understood that the condenser 102 may be installed at various other locations. However, it is preferable that the remote condenser 102 be mounted away from the engine compartment 103 such that the electric fans 104 may draw cooler outside air across the remote condenser 102.

The remote condenser 102 is preferably an existing auxiliary power unit condenser, such as those readily available from manufacturers such as Thermo King®. The remote condenser 102 is sized based on a size of a cab of the truck. For example, for a sleeper cab truck a larger-sized remote condenser 102 may be desired to cool a larger interior space of the sleeper cab truck. In some embodiments, two or more remote condensers 102 may be used to meet the cooling needs of the truck cab. In a preferable embodiment, the remote condenser 102 comprises a condenser core from an auxiliary power unit.

Referring again to FIG. 2, the original belt-driven cooling fan 20 (FIG. 1) may also be removed along with an existing fan shroud and any other pieces configured to operate with the original cooling fan 20. An electric cooling fan 110 may be installed immediately behind the truck's radiator 22 such that the electric cooling fan 110 draws air through the radiator 22. The electric cooling fan 110 may be powered by a power source such as one or more batteries 107 of the truck.

Figure 6:
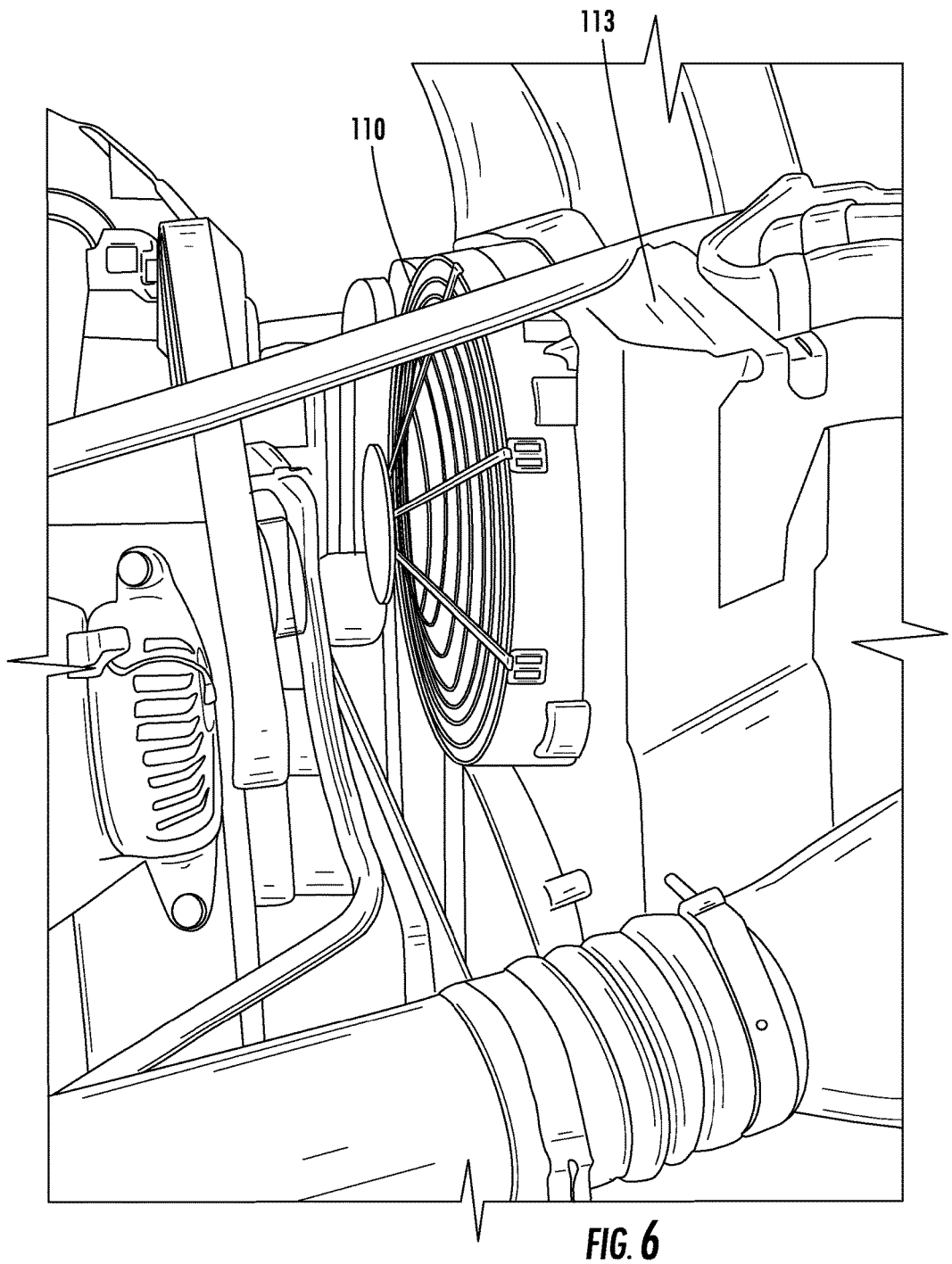
FIG. 6 shows a plurality of electric cooling fans surrounded by a shroud according to one embodiment of the present disclosure.

The electric cooling fan 110 may be formed of one or more electric fans positioned adjacent the radiator 22. For example, the electric cooling fan 110 may comprise approximately four 15" diameter electrical cooling fans mounted to a fan shroud 113 (FIG. 6) positioned adjacent the radiator 22. One or more control units 109 may be in electrical communication with the four electric cooling fans for activating one or more of the electric cooling fans. The four electric cooling fans surrounded by the fan shroud may be activated by a thermostat 111 that is in communication with a cooling fluid of the truck's engine or, alternatively, may include a manual activation switch 113 mounted within a cab of the truck for manual activation of one or more of the electric cooling fans. The electric cooling fans may be activated by the control unit based on a cooling need of the truck's engine. For example, when the truck is operating at highway speeds in a cooler environment, all of the electric cooling fans may be deactivated. At intermediate temperatures or cooling needs, fewer than all of the electric cooling fans may be activated to provide cooling to the truck's engine. Under high load and temperature conditions, all of the electric cooling fans may be activated to maximize cooling of the engine.

In one embodiment, the one or more control units 109 are in electronic communication with an engine control unit of the truck. Data from the engine control unit may be transmitted to the one or more control units to determine a temperature of coolant of the truck or otherwise determine a load being placed on the engine of the truck. For example, the one or more control units 109 may read a coolant temperature of the engine and activate or deactivate one or more of the cooling fans 110 based on cooling needs of the truck.

In another embodiment, the heavy duty truck may include a stock oil cooler 114 (FIG. 1) adjacent to the truck's radiator or otherwise located within the engine bay 103 of the truck. To further enhance a cooling ability of the electric fans 104 the stock oil cooler 114 may be removed and a remote oil cooler 116 (FIG. 2) installed external to the engine bay 103 of the truck. For example, the remote oil cooler 116 may be installed on a back of the cab of the truck near the remote condenser 102. A modified oil loop 118 allows engine oil to flow from the engine 11 to the remote oil cooler 116 and back to the engine 11, thereby reducing engine oil temperature and increasing an unobstructed surface area of the radiator 22 for cooling. In one embodiment, an oil purification system 120 is installed on the truck in fluid communication with the modified oil loop 118.

In operation, the compressor 12, which is driven by the belt 13 attached to the engine 11, pressurizes and circulates a refrigerant in the air conditioning system 10. High pressure vaporized refrigerant travels through one or more refrigerant lines to the remote condenser 102 and enters the condenser 102. The refrigerant then passes through the condenser 102 and is liquefied. Outside air is drawn through the condenser 102 by the electric fans 104. The liquefied refrigerant then enters the evaporator 16 where a blower urges air across the evaporator and into an interior of a cab of the truck for cooling. The electric cooling fan 110 draws outside air through the radiator 22 to cool the truck's engine 11.

In one alternative embodiment, the remote condenser 102 may be in communication with both the primary air conditioning loop of the truck and a secondary air conditioning loop of the truck. For example, the truck may also include a secondary air conditioning loop comprising an auxiliary power unit for powering system of the truck when the truck is stationary. One or more valves and additional refrigerant lines may be in communication with the remote condenser 102 such that the remote condenser may operate with the primary cooling system while the truck is in operation and with the secondary cooling system when the truck is stationary.

A method of modifying a truck having an air conditioning system shown in FIG. 1 is also provided. First, a truck is provided that includes a condenser 14 located adjacent to the truck's radiator 22. The truck also includes a cooling fan 20 and compressor 12 that are driven by one or more belts connected to the truck's engine 11.

In a first step, the truck's condenser 14 is removed from the truck along with any refrigerant lines attached to the condenser 14. The remote condenser 102 is installed on the truck outside of the truck's engine bay, and preferably attached to a back of the cab of the truck. Refrigerant lines are routed from the remote condenser 102 to other components of the truck's primary air conditioning system loop. The refrigerant lines may be routed underneath or through the truck's cab and into the truck's engine bay. One or more cables are attached to the remote condenser 102 to power the electric fans 104 of the condenser.

In a second step, the truck's cooling fan 20 is removed. The one or more belts driving the cooling fan may be removed or otherwise altered such that the engine no longer drives the cooling fan. An electric cooling fan 110 and shroud are installed into the truck's engine bay adjacent the truck's radiator. One or more cables are attached to the electric cooling fan 110 and one or more batteries of the truck to power the cooling fan 110.

In one embodiment, a kit of parts may be provided for modifying a truck's cooling system according to the above steps. The kit of parts may include one or more remote condensers, mounting hardware for securing the one or more condensers to a remote location on the truck, one or more electric cooling fans, a fan shroud configured to receive the one or more electric cooling fans, one or more control units for activating the electric cooling fans, and various other components including refrigerant lines and other hardware necessary to mount the kit of parts to the truck.

The modified cooling system described herein has been found to increase a fuel efficiency of a truck by 10% or more. The system of the present disclosure increases fuel efficiency by reducing a load placed on an engine caused by drawing outside air through both the condenser and radiator of the truck using the truck's cooling fan. Further, by introducing an electric cooling fan and removing the belt-drive cooling fan typically found in a heavy duty truck, an efficiency of the engine is further increased.

It was found that by simply trying to modify a standard heavy duty truck to replace the belt-driven cooling fan and replacing the fan with an electrical fan resulted in overheating of the truck engine and resulted in wires of the electrical cooling fan to be burned due to high electrical loads necessary to cool the engine. It was found that be removing the original condenser core located adjacent the truck's radiator that the electrical cooling fan could then sufficiently cool the truck's engine during high load applications. Further, by positioning the condenser in a location remote from the engine bay of the truck, the primary air conditioning system operated more efficiently and further reduced a load required on the engine to power the air conditioning system. Other advantages that have been found as a result of the modified system of the present disclosure include an increased period of time before an air filter of the truck must be changed and reduced stress on engine components. Further, the efficiency gains provided by the modifications of the present disclosure have been found to be significantly greater than expected.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A method of modifying a primary air conditioning loop of a heavy duty truck, the primary air conditioning loop having a compressor, a condenser mounted within an engine bay of the truck, an evaporator, and a cooling fan belt-driven by an engine of the truck mounted within the engine bay adjacent a radiator of the truck, the method comprising:
   removing the condenser from the engine bay;
   removing the belt-driven cooling fan from the engine bay;
   installing a remote condenser on the truck at a location that is external from the engine bay, the remote condenser in fluid communication with the primary air conditioning loop of the truck;
   installing an electric cooling assembly in the engine bay adjacent to the radiator of the truck, the electric cooling assembly comprising one or more electrically powered cooling fans and a surrounding shroud;
   installing a control unit in electrical communication with the one or more cooling fans, wherein the control unit activates or deactivates one or more of the electrically powered cooling fans based on cooling needs of the engine.

2. The method of claim 1, wherein the remote condenser is mounted on a back of a cab of the heavy duty truck.

3. The method of claim 1, wherein the remote condenser includes one or more electrically powered condenser fans mounted adjacent to the condenser.

4. The method of claim 1, further comprising installing a manual activation switch for activating the one or more electrically powered cooling fans of the electric cooling assembly.

5. The method of claim 1, further comprising installing a thermometer adjacent to the radiator of the truck, wherein the installed control unit activates or deactivates one or more of the electrically powered fans based on a temperature measured by the installed thermometer.

6. The method of claim 1, wherein the control unit is in communication with an engine control unit of the truck, and wherein the control unit activates or deactivates one or more of the electrically powered fans based on data from the engine control unit.

7. The method of claim 1, wherein the remote condenser comprises an auxiliary power unit condenser.

8. The method of claim 1, wherein the truck further includes a secondary air conditioning loop that is operable when the engine is off, and wherein the installed remote condenser is also in fluid communication with the secondary air conditioning loop.

9. The method of claim 1, wherein the cooling assembly comprises four electrically powered cooling fans oriented in a 2×2 arrangement and surrounded by the shroud.

10. The method of claim 1 further comprising:
    removing an oil cooler from the engine bay of the truck and
    installing a remote oil cooler at a location that is external to the engine bay of the truck.

11. The method of claim 10, further comprising installing an oil purification system external to the engine bay of the truck, the oil purification system in fluid communication with the remote oil cooler.

12. A method of modifying a primary air conditioning loop of a heavy duty truck, the primary air conditioning loop having a compressor, a condenser mounted within an engine bay of the truck, an evaporator, and a cooling fan belt-driven by an engine of the truck mounted within the engine bay adjacent a radiator of the truck, the method comprising:
    removing the condenser from the engine bay;
    removing the belt-driven cooling fan from the engine bay;
    installing a remote condenser on the truck external from the engine bay on a back of a cab of the truck, the remote condenser in fluid communication with the primary air conditioning loop of the truck, the remote condenser including one or more electrically powered condenser fans mounted adjacent to the condenser;
    installing an electric cooling assembly in the engine bay adjacent to the radiator of the truck, the electric cooling assembly comprising four electrically powered cooling fans oriented in a 2×2 arrangement and surrounded by a shroud;
    installing a control unit in electrical communication with the one or more cooling fans, wherein the control unit activates or deactivates one or more of the electrically powered cooling fans based on cooling needs of the engine; and
    installing a manual activation switch for activating the one or more electrically powered cooling fans of the electric cooling assembly.

13. The method of claim 12 further comprising:
    removing an oil cooler from the engine bay of the truck and
    installing a remote oil cooler at a location that is external to the engine bay of the truck.

14. A method of modifying a primary air conditioning loop of a heavy duty truck, the primary air conditioning loop having a compressor, a condenser mounted within an engine bay of the truck, an evaporator, and a cooling fan belt-driven by an engine of the truck mounted within the engine bay adjacent a radiator of the truck, the method comprising:
    removing the condenser from the engine bay;
    removing the belt-driven cooling fan from the engine bay;
    installing a remote condenser on the truck external from the engine bay on a back of a cab of the truck, the remote condenser in fluid communication with the primary air conditioning loop of the truck, the remote condenser including one or more electrically powered condenser fans mounted adjacent to the condenser;
    installing an electric cooling assembly in the engine bay adjacent to the radiator of the truck, the electric cooling assembly comprising four electrically powered cooling fans oriented in a 2×2 arrangement and surrounded by a shroud;

installing a control unit in electrical communication with the one or more cooling fans, wherein the control unit activates or deactivates one or more of the electrically powered cooling fans based on cooling needs of the engine;

installing a manual activation switch for activating the one or more electrically powered cooling fans of the electric cooling assembly;

removing an oil cooler from the engine bay of the truck; and installing a remote oil cooler at a location that is external to the engine bay of the truck.

\* \* \* \* \*